United States Patent
Huhse et al.

(10) Patent No.: US 8,830,563 B2
(45) Date of Patent: Sep. 9, 2014

(54) LASER SCANNING MICROSCOPE HAVING A LASER DIODE COMPRISING A LIGHT MODULATION DEVICE

(75) Inventors: Dieter Huhse, Berlin (DE); Stefan Wilhelm, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 378 days.

(21) Appl. No.: 12/999,194

(22) PCT Filed: Jun. 12, 2009

(86) PCT No.: PCT/EP2009/004265
§ 371 (c)(1),
(2), (4) Date: Dec. 15, 2010

(87) PCT Pub. No.: WO2009/153006
PCT Pub. Date: Dec. 23, 2009

(65) Prior Publication Data
US 2011/0096386 A1    Apr. 28, 2011

(30) Foreign Application Priority Data
Jun. 17, 2008   (DE) .......................... 10 2008 028 707

(51) Int. Cl.
*G02B 21/00* (2006.01)
(52) U.S. Cl.
CPC ................................ *G02B 21/0032* (2013.01);
*G02B 21/0076* (2013.01)
USPC ........................... 359/298; 372/50.1; 356/318
(58) Field of Classification Search
USPC ......... 359/245, 248, 254, 237, 238, 298, 344, 359/368, 385; 356/480, 318; 385/18, 9, 15, 385/31, 39, 42, 118; 250/205, 458.1, 459.1; 372/50.1, 50.22
See application file for complete search history.

(56) References Cited

U.S. PATENT DOCUMENTS 5,457,569 A * 10/1995 Liou et al. ...................... 359/344
6,014,478 A *  1/2000 Spaeth ............................. 385/18

(Continued)

FOREIGN PATENT DOCUMENTS

| DE | 197 02 753 | 7/1998 |
|----|------------|--------|
| DE | 102 57 423 | 6/2004 |
| DE | 10 2006 039 083 | 2/2008 |

OTHER PUBLICATIONS

"OM5642W-30B Preliminary—40 Gb/s EA Modulator with Single Mode Fiber, Built-in Cooler", OKI Electronic Components datasheet, [Online] Aug. 2001, XP002540772.

(Continued)

*Primary Examiner* — Tuyen Tra
(74) *Attorney, Agent, or Firm* — Frommer Lawrence & Haug LLP

(57) ABSTRACT

The invention makes it possible to adjust the light intensity of a laser scanning microscope laser beam in an economical manner and with high accuracy. A separate acousto-optic component can be omitted in that a light modulation section such as an electroabsorption modulator (EAM) or a semiconductor amplifier (SOA) is arranged directly at the laser diode, advisably at one of its front sides. It is nevertheless possible to control the light intensity economically and with high accuracy because the important parameters of the laser beam remain unchanged when the optical output power is changed by the light modulation section. The light modulation section is preferably formed integral with the laser diode in at least one material layer.

23 Claims, 3 Drawing Sheets

(56) References Cited

U.S. PATENT DOCUMENTS

| | | |
|---|---|---|
| 6,423,956 B1 | 7/2002 | Mandella et al. |
| 6,917,055 B2 * | 7/2005 | Stegmuller ............... 257/85 |
| 2005/0012993 A1 * | 1/2005 | Araya .................. 359/385 |
| 2005/0018203 A1 | 1/2005 | Hogan |
| 2005/0035295 A1 | 2/2005 | Bouma et al. |
| 2007/0273952 A1 * | 11/2007 | Murray .................. 359/238 |

OTHER PUBLICATIONS

"OL5157M Preliminary—1550 nm 40 Gb/s EA Modulator Integrated DFB Laser", OKI Electronic Components datasheet, [Online] Dec. 2005, XP002540773.

* cited by examiner

Fig. 1 - Prior Art

LASER SCANNING MICROSCOPE HAVING A LASER DIODE COMPRISING A LIGHT MODULATION DEVICE

The present application claims priority from PCT Patent Application No. PCT/EP2009/004265 filed on Jun. 12, 2009, which claims priority from German Patent Application No. DE 10 2008 028 707.5 filed on Jun. 17, 2008, the disclosure of which is incorporated herein by reference in its entirety.

BACKGROUND OF THE INVENTION

1. Field of the Invention

The invention is directed to a laser scanning microscope (LSM) with a laser diode.

2. Description of Related Art

Laser scanning microscopes (LSM) are used for confocal recording of images of a sample by a laser beam which usually scans in a zigzag shape. Prior to a scanning process, individual regions to be recorded (regions of interest, or ROI) can be determined. To avoid unnecessary stress on the sample, the laser light should be switched on as accurately as possible upon entering the region to the scanned. This is also true for the peripheral regions of the sample, which are generally not to be imaged, in the area where the laser beam changes direction because the speed at which the laser beam moves over the sample is slowest in this area and the radiation loading is therefore at its highest. In addition to processes for switching on and switching off from and to the zero level, changes in the beam intensity between two intensity levels other than zero are also required depending on the application.

In the prior art, the light intensity of a laser beam of a diode laser in an LSM can be controlled with high accuracy by means of an acousto-optic component, for example, an AOM (acousto-optic modulator) or an AOTF (acousto-optic tunable filter). This is disclosed, for example, in DE 197 02 753 A1. However, a component of this kind requires a relatively large installation space and is costly.

In order to dispense with an acousto-optic component while nevertheless enabling adjustment of the light intensity on the sample, the optical output power of the laser diode can be controlled directly by changing the electric current. In this way, both the attenuation function and the modulation function can be achieved in a manner analogous to the use of an acousto-optic component.

However, laser diodes which are modulated directly by diode current have drawbacks with respect to imaging. The most severe drawback is that important laser parameters become unstable when it becomes necessary in a certain application to reduce the diode current in the range of the laser threshold. Particularly noteworthy parameters are the polarization, which can fall from values greater than 100:1 to well below 10:1, and the spectral width of the laser beam—the diode transitions seamlessly from laser mode to LED mode so that the spectral width can increase to several nanometers. Stability and power calibration are also critical because the diode becomes unstable in the current intensity range around the laser threshold, which leads to excessive noise. Further, the threshold current exhibits a variation over the lifetime of the laser diode so that it is necessary to calibrate the power in the threshold range at regular intervals. Moreover, a change in current through the laser diode within the framework of direct modulation, also above the laser threshold, results in a slight shift of the center wavelength of the emitted spectral line. This can lead to a change in the beam direction due to the dispersion of the prisms used for beam shaping or in the microscope M or scanning unit S, which impairs the accuracy of exposure.

Another application of a LSM is fluorescence lifetime imaging (FLIM). In this case, short laser pulses of durations typically from 20 ps to 100 ps are used as illumination. In the prior art, these short laser pulses are generated by means of a laser diode controlled by electric pulses, so-called gain switching. In so doing, the electric pulses are adapted to the respective individual laser diode so as to generate optimal optical pulses (i.e., with a full width (FWHM) from 20 ps to 100 ps, steep edges, insignificant or nonexistent shoulders, and no long afterglows). Changes in intensity are caused by neutral density glass because changes in intensity due to a change in the electric control parameters (e.g., the electric pulse height and pulse width or CW bias current) necessarily entail changes in the optical pulse shape and can therefore be carried out only within a narrow, carefully selected range.

SUMMARY OF THE INVENTION

It is the object of the invention to improve a laser scanning microscope of the type mentioned above in such a way that the light intensity of the laser diode can be controlled economically and with high accuracy.

According to the invention, a light modulation section is arranged directly at the laser diode, advisably at one of its front sides. In particular, the light modulation section can be associated with the laser diode as an integral component part.

By means of the solution according to the invention, a separate acousto-optic component can be omitted. Nevertheless, it is possible to control the light intensity economically and with great accuracy because the important parameters of the laser beam (beam profile, wavelength, pulse shape, polarization, noise) remain unchanged when the optical output power is changed by means of the light modulation section. Further, an appreciable reduction in the required installation space is achieved with a light source of this kind. Different measuring processes and evaluating processes can be advantageously combined with a laser scanning microscope that is outfitted according to the invention.

A first preferred embodiment form of a light modulation section of the type mentioned above is an electroabsorption modulator (EAM) serving as an optical switch/dimmer. An EAM is an optical modulator which is based on semiconductor material and which is usually based on the Franz-Keldysh effect or the quantum-confined Stark effect. The use of EAMs is state of the art in optical data communications. By applying and/or adjusting an electrical field, the absorption can be controlled in a semiconductor with a suitable band gap (without excitation of electrons), which results in a corresponding change in transmission. For technical applications, it is particularly relevant that this effect is stable under different operating conditions. First EAMs are commercially available (for example, Model OM5642W-30B by OKI). EAMs have the advantage over acousto-optic modulators that they can be operated with DC voltage, whereas AOMs must be controlled by electric signals with high frequencies, typically 80 MHz to 120 MHz, and high power, typically 50 mW to 200 mW.

In a second preferred embodiment form, the light modulation section is advantageously a semiconductor optical amplifier (SOA). The semiconductor optical amplifier can advisably be constructed as a tapered amplifier. Both variants allow an economical intensity modulation and have a low variation in the rise time (delay) of the light intensity. The semiconductor-based light modulation section can advantageously be constructed monolithically with the laser diode for an integral construction.

The arrangement of the light modulation section directly at the laser diode can be realized in two alternative ways. The light modulation section is preferably formed integral with the laser diode in at least one material layer. A light source of maximum compactness is provided in that the laser diode and the EAM are both made of a semiconductor wafer. Diodes of this kind are also already commercially available (OKI OL5157M) as so-called distributed feedback lasers (DFB) for optical telecommunications. Further, in an advantageous manner, there is no need for a free-space section between the laser diode and the modulation section.

As an alternative to an integral construction of the laser diode and light modulation section, the light modulation section can also be advantageously arranged as a separate component part at a front side of the laser diode. This alternative also allows a compact construction and makes it possible to dispense with a free-space section.

In a preferred embodiment, the light modulation section or the integrated unit comprising the laser diode and light modulation section is provided with a direct (fixed) fiber coupling (pigtail). The direct fiber coupling has the advantage that a laser module coupled to an LSM in this way is compact, stable, and requires no adjustment on the part of the user. Moreover, it allows for simple integration into an existing device concept. In an alternative embodiment form, a fiber manipulator is mounted in a compact manner directly at a front side of the light modulation section.

The LSM is advantageously outfitted with a control unit which operates the laser diode permanently and significantly above a laser threshold. Fluctuations in beam parameters can be prevented in this way.

A control unit is advantageously provided which adjusts the optical output power of the laser diode by means of the integrated light modulation section. This control unit may be the same as or different than the control unit for modulating the current of the laser diode.

An LSM according to the invention can advantageously be used for fluorescence lifetime imaging (FLIM) in which the laser diode is used in pulsed mode. The high shape fidelity of the pulses modulated by means of the light modulation section with respect to the electric control signal makes it possible to carry out fluorescence excitation with greater accuracy.

DETAILED DESCRIPTION OF EMBODIMENTS

Figure 1:
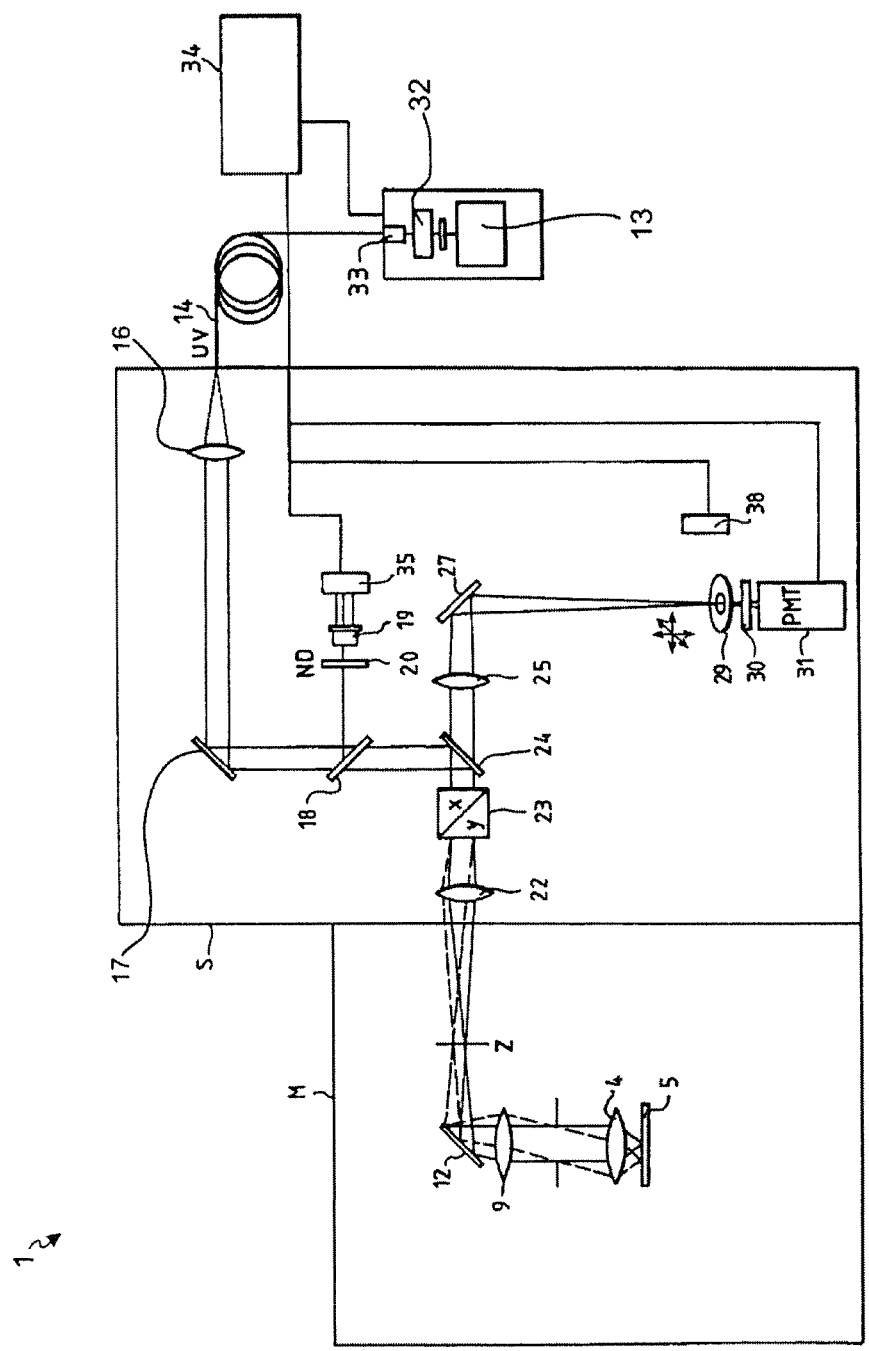
FIG. 1 shows a laser scanning microscope with a laser diode according to the prior art.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Identical parts have identical reference numerals in all of the drawings.

FIG. 1 shows a schematic view of a laser scanning microscope 1 known from the prior art. It comprises a microscope unit M, a scanning unit S having a common optical interface by means of an intermediate image Z, and a laser module L. The scanning unit S can be connected to the photo tube of an upright microscope as well as to the side output of an inverted microscope. The microscope unit M has an objective 4 and a tube lens 9 for observing a sample 5.

The scanning unit S contains collimating optics 16, a deflecting mirror 17, a scanning objective 22, a scanner 23, a main beamsplitter 24, and imaging optics 25 for detection. A monitoring beam path is masked out by a semitransparent mirror 18 in direction of a monitoring diode 19 which is arranged in front of a neutral filter 20. A deflecting mirror 27 behind the imaging optics 25 reflects the beam coming from the sample 5 in the direction of the pinhole diaphragm 29 which is adjustable perpendicular to the optical axis and whose diameter is variable, and downstream of which are arranged an emission filter 30 and a suitable receiver element 31, for example, a photomultiplier (PMT). An external control unit 34 is connected to local control units 35 and 38 for the monitor diode 19 and the adjustable pinhole diaphragm 29.

The separate laser module L contains a laser diode 13 as individual light source, whose laser beam is initially freely propagated after exiting from the laser diode 13 and passes through an acousto-optic component 32, for example, an AOTF. The laser beam is then coupled into the illumination beam path of the scanning unit S by a fiber manipulator 33 and a light-conducting fiber 14.

The laser diode 13 emits a wavelength of 405 nm, for example. It provides two different operating modes: a standby mode which on the one hand serves to protect the laser diode 13, and on the other hand protects the sample from excessive radiation stress with an optical output power appreciably below the maximum value (e.g., by a factor of 10,000), and an imaging mode (e.g., with optical maximum optical power) in which the laser line serves to record images. Alternatively, the laser diode 13 can also be operated below its maximum output in certain applications. The possible applications of the imaging mode can be divided into two groups. On one hand, sample light can be recorded. In this case, it is necessary to vary the laser output in the low power range for optimally adapting the laser power to the operating conditions (absorption, emission of fluorescence dye, pixel time). On the other hand, it can be used for sample manipulation. In so doing, certain regions of the sample 5 must be irradiated at maximum laser power. In the first case, the laser power must be adjusted as continuously as possible. Further, it is desirable to adapt the illumination phases of the sample (which means a laser radiation load) to the actual image recording times in order to protect the sample. In the second case, it is necessary above all to switch the laser power on and off quickly and, as far as possible, so as to be pixel-synchronous. In both cases, the adjustment of the power of the laser beam is realized with the acousto-optic component 32 which is arranged in the free-space section between the laser and fiber.

Figure 2:
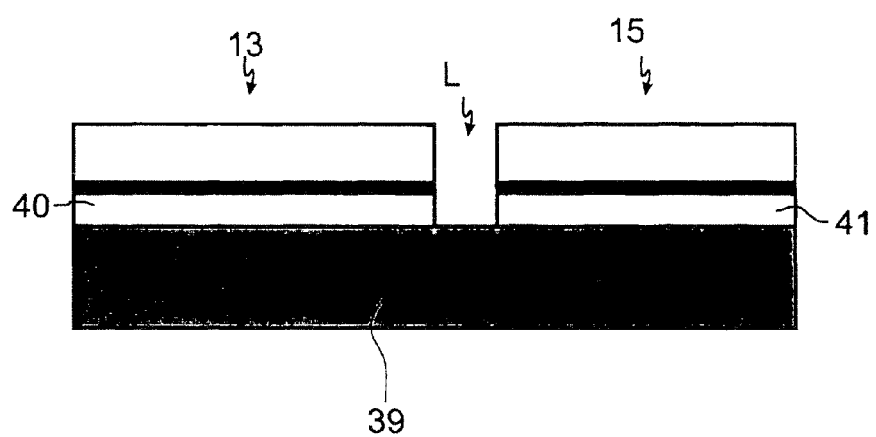
FIG. 2 shows a laser diode unit with a light modulation section.

FIG. 2 shows a laser diode 13 with a light modulation section 15. The semiconductor layers of the laser diode 13 and of the light modulation section 15 are arranged on a common substrate 39 so that they form an integral unit. An air gap L is arranged between the active layer 40 of the laser diode 13 and the active layer 41 of the light modulation section 15 for electric insulation.

Figure 3:
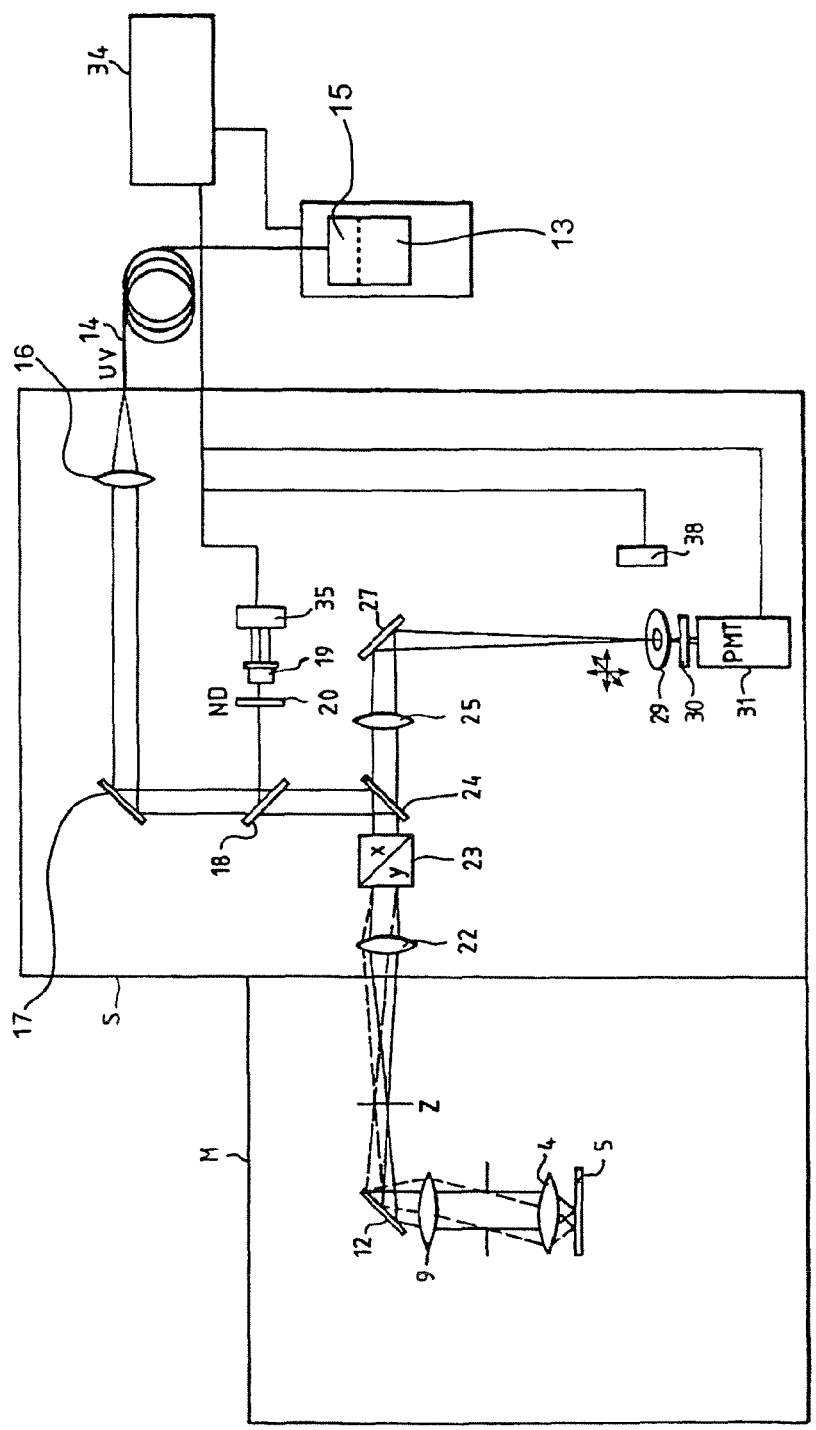
FIG. 3 shows a laser scanning microscope according to the invention with a laser diode.

FIG. 3 shows an LSM 1 in a configuration having, by way of example, a laser diode 13 which has an integrated light modulation section 15. Accordingly, it is also possible to adjust the light intensity/power of the laser beam with an acousto-optic component. The laser diode 13 can emit a wavelength of 375 nm, 405 nm, 440 nm, 473 nm, 488 nm or 635 nm, for example. Apart from the laser module L, the LSM 1 is constructed in the same way as the LSM 1 according to FIG. 1, which is already known. In alternative embodiment forms (not shown), the LSM 1 can also be outfitted, for example, with additional lasers, particularly with a plurality of laser modules L and/or a plurality of lasers in one laser module L. Further, for purposes of multichannel detection, it can have a plurality of detectors 31 which are coupled with the imaging beam path by beamsplitters, for example. As an alternative to the integral construction of the light modulation section 15, the latter can be arranged (not shown) directly at the front side of the laser diode 13 as a separate component.

The invention consists in that a quasi-direct modulation of laser diodes with high exposure accuracy is made possible in laser scanning microscopes. For example, the integrated light modulation section 15 can be constructed as an electroabsorption modulator. In so doing, the laser diode 13 itself is not modulated but, rather, the optical output power of the laser diode 13 running at constant power is modulated in the EAM located directly after the laser diode 13 in the beam direction.

EAMs are available at low cost as individual components or also directly integrated with a laser diode. An EAM is a semiconductor component having a construction similar to that of a laser diode 13. Therefore, it can be produced in approximately the same size as a laser diode 13 and can also be directly integrated with a laser diode 13. The laser module L can accordingly be constructed in a compact manner. Because the intensity of the laser beam is modulated by means of an EAM instead of directly by the diode current, the laser diode 13 can always run in laser mode at high power (appreciably above the laser threshold). In this way, the problems mentioned above relating to current modulation (spectrum, polarization, noise) are prevented.

Instead of an EAM, an optical semiconductor amplifier (SOA) can be used. An SOA is constructed like a semiconductor laser diode, but its two end faces are anti-reflective. Therefore, the SOA acts only as an amplifier rather than as a laser. Its gain and, therefore, the optical output power of the laser diode 13 can be controlled by the electric current flowing through the SOA. Owing to its small size, an SOA can be compactly integrated together with the laser diode 13 in a small housing. As with the EAM, the (master) laser diode 13 is always operated far above the laser threshold. The optical power is regulated by the (slave) SOA. The advantage of this arrangement is that the output power of the laser diode 13 is not only attenuated, but can also be amplified if necessary. In this way, higher output powers can be achieved than with the laser diode 13 by itself. This arrangement is also known as a MOPA (Master Oscillator Power Amplifier). The amplifier can be designed in a variety of ways, for example, as a tapered amplifier, to reach particularly high output powers. Both the EAM and the SOA are suitable for CW mode as well as for the pulsed mode of the laser diode 13.

Because of the compact construction of the laser diode 13, whose optical output power is controllable, the light modulation section 15 can be fiber-coupled directly. In-coupling optics are dispensed with so that it is not necessary to adjust the LSM 1 prior to putting it to use. Further, since no acousto-optic component is required, no free-space section is required. In this way, the laser module L can be constructed even more compactly.

As an alternative to direct fiber coupling, a fiber manipulator (not shown) can be arranged directly at one front side of the light modulation section 15. In this alternative embodiment, the fiber manipulator must be aligned before the LSM 1 is put into operation. Nevertheless, the laser module L is compact and economical.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 laser scanning microscope
4 objective
5 sample
9 tube lens
12 mirror
13 laser diode
14 light-conducting fiber
15 light modulation section
16 collimating optics
17 deflecting mirror
18 semitransparent mirror
19 monitor diode
20 neutral filter
22 scanning objective
23 scanner
24 main beamsplitter
25 imaging optics
27 deflecting prism
29 pinhole diaphragm
30 emission filter
31 receiver element
32 acousto-optic component
33 fiber manipulator
34 central control unit
35 control unit for monitor diode 19
38 control unit for pinhole diaphragm 29
39 substrate
40, 41 active layers
M microscope unit
S scanning unit
L air gap

The invention claimed is:

1. A laser scanning microscope comprising:
   a laser diode; and
   a light modulation section;
   wherein the light modulation section of the laser scanning microscope is arranged directly at the laser diode of the laser scanning microscope,
   wherein the light modulation section is formed integral with the laser diode in at least one material layer.

2. The laser scanning microscope according to claim 1; wherein the light modulation section is associated with the laser diode as an integral part.

3. The laser scanning microscope according to claim 1; wherein the light modulation section comprises a semiconductor material.

4. The laser scanning microscope according to claim 3; wherein the light modulation section is an electroabsorption modulator.

5. The laser scanning microscope according to claim 3; wherein the light modulation section is a semiconductor optical amplifier.

6. The laser scanning microscope according to claim 5; wherein the semiconductor optical amplifier is constructed as a tapered amplifier.

7. The laser scanning microscope according to claim 1; wherein the laser diode is arranged in an illumination module and is provided with direct fiber coupling.

8. The laser scanning microscope according to claim 1; wherein the laser diode is arranged in an illumination module; and
wherein a fiber manipulator is arranged directly at a front surface of the light modulation section.

9. The laser scanning microscope according to claim 1, further comprising:
a control unit which operates the laser diode permanently and significantly above a laser threshold.

10. The laser scanning microscope according to claim 1, further comprising:
a control unit which adjusts an optical output power of the laser diode by means of the light modulation section.

11. The laser scanning microscope according to claim 1; wherein the laser diode can be switched between pulsed mode and continuous mode.

12. A laser scanning microscope comprising:
a laser diode; and
a light modulation section;
wherein the light modulation section of the laser scanning microscope is arranged directly at the laser diode of the laser scanning microscope,
wherein the light modulation section is a semiconductor optical amplifier constructed as a tapered amplifier.

13. The laser scanning microscope according to claim 12; wherein the light modulation section is associated with the laser diode as an integral part.

14. The laser scanning microscope according to claim 12; wherein the light modulation section is formed integral with the laser diode in at least one material layer.

15. The laser scanning microscope according to claim 12; wherein the light modulation section is arranged as a separate component part at a front side of the laser diode.

16. The laser scanning microscope according to claim 12; wherein the light modulation section comprises a semiconductor material.

17. The laser scanning microscope according to claim 16; wherein the light modulation section is a semiconductor optical amplifier.

18. The laser scanning microscope according to claim 17; wherein the semiconductor optical amplifier is constructed as a tapered amplifier.

19. The laser scanning microscope according to claim 12; wherein the laser diode is arranged in an illumination module and is provided with a direct fiber coupling.

20. The laser scanning microscope according to claim 12; wherein the laser diode is arranged in an illumination module; and
wherein a fiber manipulator is arranged directly at a front surface of the light modulation section.

21. The laser scanning microscope according to claim 12, further comprising:
a control unit which operates the laser diode permanently and significantly above a laser threshold.

22. The laser scanning microscope according to claim 12, further comprising:
a control unit which adjusts an optical output power of the laser diode by means of the light modulation section.

23. The laser scanning microscope according to claim 12; wherein the laser diode can be switched between pulsed mode and continuous mode.

* * * * *

UNITED STATES PATENT AND TRADEMARK OFFICE
CERTIFICATE OF CORRECTION

PATENT NO. : 8,830,563 B2
APPLICATION NO. : 12/999194
DATED : September 9, 2014
INVENTOR(S) : Dieter Huhse and Stefan Wilhelm It is certified that error appears in the above-identified patent and that said Letters Patent is hereby corrected as shown below:

ON THE TITLE PAGE

Assignees, please replace "Carl Ziess MicroImaging GmbH" with --Carl Zeiss Microscopy GmbH--.

Signed and Sealed this
Seventh Day of June, 2016

Michelle K. Lee
*Director of the United States Patent and Trademark Office*